United States Patent
Brummer et al.

(10) Patent No.: US 12,316,476 B2
(45) Date of Patent: May 27, 2025

(54) LIN BUS VIA BACKBONE BUS TUNNELING

(71) Applicant: Bayerische Motoren Werke Aktiengesellschaft, Munich (DE)

(72) Inventors: Florian Brummer, Geisenfeld (DE); Helmut Kellermann, Oberschleissheim (DE)

(73) Assignee: B ayerische M otoren W erke A ktiengesellschaft, Munich (DE)

( * ) Notice: Subject to any disclaimer, the term of this patent is extended or adjusted under 35 U.S.C. 154(b) by 47 days.

(21) Appl. No.: 17/918,832

(22) PCT Filed: Mar. 29, 2021

(86) PCT No.: PCT/EP2021/058096
§ 371 (c)(1),
(2) Date: Oct. 13, 2022

(87) PCT Pub. No.: WO2021/239298
PCT Pub. Date: Dec. 2, 2021

(65) Prior Publication Data
US 2023/0139148 A1    May 4, 2023

(30) Foreign Application Priority Data
May 25, 2020  (DE) ..................... 10 2020 113 977.2

(51) Int. Cl.
*H04L 12/40*  (2006.01)
*H04L 12/403* (2006.01)

(52) U.S. Cl.
CPC ...... *H04L 12/403* (2013.01); *H04L 12/40013* (2013.01); *H04L 2012/40234* (2013.01); *H04L 2012/40273* (2013.01)

(58) Field of Classification Search
CPC .............................. H04L 12/403; H04L 12/40
See application file for complete search history.

(56) References Cited

U.S. PATENT DOCUMENTS 8,705,527 B1    4/2014  Addepalli et al.
10,797,909 B2 * 10/2020  Kolbus ............ H04L 12/40091
(Continued)

FOREIGN PATENT DOCUMENTS

DE    10 2004 053 952 A1    5/2006
DE    10 2011 117 083 A1    5/2013
(Continued)

OTHER PUBLICATIONS

Application Of LIn bus in vehicle Network, Yan yan Xu, IEEE, Xplore (Year: 2006).*
(Continued)

*Primary Examiner* — Henry Tsai
*Assistant Examiner* — Christopher A Daley
(74) *Attorney, Agent, or Firm* — Crowell & Moring LLP (57) ABSTRACT

Embodiments relate to a system for transmitting data in a motor vehicle. A central electronic control unit comprises at least one LIN master, and at least one local controller, which is coupled to the central controller by means of a first data connection. The local controller is additionally coupled to a LIN bus, which is paired with the LIN master and to which at least one LIN slave is connected. The data transmission speed of the first data connection between the central controller and the local controller is faster than the data transmission speed of the LIN bus. Methods for actuating a LIN slave connected to a LIN bus and to a motor vehicle are also provided.

15 Claims, 3 Drawing Sheets

(56) References Cited

U.S. PATENT DOCUMENTS

| | | | |
|---|---|---|---|
| 11,240,061 B2* | 2/2022 | Siergiej | H04L 12/40 |
| 2004/0003153 A1* | 1/2004 | Froeschl | H04L 12/40169 |
| | | | 710/104 |
| 2014/0133350 A1 | 5/2014 | Triess et al. | |
| 2014/0297913 A1 | 10/2014 | Odenbreit | |
| 2017/0072876 A1* | 3/2017 | Rajan | G06F 13/4282 |
| 2017/0180397 A1 | 6/2017 | Sikand et al. | |
| 2017/0359195 A1* | 12/2017 | Bender | H04L 12/40006 |
| 2019/0058675 A1 | 2/2019 | Schubert et al. | |
| 2019/0306180 A1* | 10/2019 | Dyakin | G06F 21/566 |
| 2020/0114768 A1* | 4/2020 | Oestreich | G01R 31/382 |
| 2023/0388251 A1* | 11/2023 | Schubert | H04L 47/30 |

FOREIGN PATENT DOCUMENTS

| | | |
|---|---|---|
| DE | 10 2013 107 221 A1 | 1/2014 |
| DE | 10 2013 212 184 A1 | 12/2014 |

OTHER PUBLICATIONS

International Search Report (PCT/ISA/210) issued in PCT Application No. PCT/EP2021/058096 dated May 28, 2021 with English translation (seven (7) pages).

German-language Written Opinion (PCT/ISA/237) issued in PCT Application No. PCT/EP2021/058096 dated May 28, 2021 (six (6) pages).

German-language Search Report issued in German Application No. 10 2020 113 977.2 dated Feb. 10, 2021 with partial English translation (13 pages).

* cited by examiner

Fig. 6

LIN BUS VIA BACKBONE BUS TUNNELING

TECHNICAL FIELD

The present subject matter relates to a system for transmitting data in a motor vehicle. The system comprises a central electronic control unit and at least one local electronic control unit. The system is designed to connect electronic control units via a LIN bus. Further examples relate to a method for controlling a LIN slave connected to a LIN bus, and to a motor vehicle which has a corresponding system or is designed to carry out the disclosed method.

BACKGROUND AND SUMMARY OF THE INVENTION

In motor vehicles, various units of the motor vehicle are controlled via data connections or bus systems. Known buses which are used in motor vehicles are, for example, LIN (Local Interconnect Network) buses, CAN (Controller Area Network) buses or FlexRay buses; in addition, discrete signals can also be transmitted in the cable harness through the entire vehicle. The buses are generally functionally designed, that is to say electronic control units which represent shared functions are connected on a bus.

A LIN system is composed of a master (LIN master) and one or more slaves (LIN slaves). The master is in the form of a microcontroller, for example, which, as a bridge for example, can connect the LIN to a CAN bus. On the LIN, the master determines the (for example permanently configured) temporal sequence of all messages by transmitting their beginning, the so-called header. One or more LIN slaves are therefore serially connected to the LIN master via a LIN bus. The transmission protocol provides for the headers to be transmitted from the LIN master to the LIN slaves. In response to the header, the LIN slave addressed in this case transmits a response back to the LIN master within a provided time slot (for example in a 5 ms or 10 ms cycle on the LIN bus). The header and response are combined as a frame which is transmitted within the duration of the provided time slot.

In the case of electronic control units for controlling a plurality of units or slaves with different functions, there is a need for an increasing number of LIN buses in motor vehicles when using LIN buses, which buses are laid as transmission cables in a cable bundle or cable harness in the vehicle. The large number of LIN buses may result in a circumference or cross section of the cable harness being large, with the result that it may be difficult to accommodate the cable harness in the limited space of the motor vehicle.

SUMMARY

It is an object of the present disclosure to provide improved concepts for transmitting signals for controlling slaves in a local area network, for example in a vehicle.

This object is achieved according to the subjects of the independent patent claims. Further advantageous embodiments are described in the dependent patent claims, the following description and in conjunction with the figures.

Accordingly, a system for transmitting data in a motor vehicle is proposed. The system comprises a central electronic control unit in which at least one LIN master is formed. At least one local electronic control unit is also provided and is coupled to the central electronic control unit by means of a first data connection.

The local electronic control unit is also coupled to a LIN bus which is assigned to the LIN master and to which at least one LIN slave is connected. In particular, provision is made for a plurality of LIN slaves to be connected to the LIN bus and to be able to be controlled by means of respectively assigned LIN masters which are arranged in the central electronic control unit. In this case, provision is made for a data transmission speed of the first data connection between the central electronic control unit and the local electronic control unit to be higher than a data transmission speed of the LIN bus. A higher data transmission speed may make it possible to transmit an identical volume of data in a shorter period of time via the first data connection than via the LIN bus.

The higher data transmission speed of the first data connection in contrast to the LIN bus may make it possible to interchange header information (for example for transmission as a header via the LIN bus) and response information (which was transmitted, for example, as a response via the LIN bus) more quickly between the central electronic control unit and the local electronic control unit. For example, a plurality of items of header information can be transmitted in this manner via the first data connection during a predefined time slot of one LIN bus. This may be advantageous if a plurality of LIN buses are connected to the local electronic control unit and are controlled by respective LIN masters of the central electronic control unit.

The proposed system makes it possible, for example, to initially transmit information from the LIN master, which is intended to be transmitted via the LIN bus, via a faster connection to the local electronic control unit, from where the information is forwarded on the slower LIN bus. In contrast to conventional systems, provision is therefore made for the LIN master to be arranged in a central, separate electronic control unit, rather than directly in the local electronic control unit.

In contrast to conventional systems, the use of the faster first data connection makes it possible, for example, to dispense with a multiplicity of transmission cables of a multiplicity of LIN buses between the central electronic control unit and the local electronic control unit since header information and response information from a plurality of LIN buses can be transmitted, for example, using a shared transmission cable of the first data connection. This can be carried out, for example, without causing a time delay when controlling the respective units on the various LIN buses. For example, as a result of the use of the first data connection, the size of a cable harness between the central electronic control unit and the local electronic control unit can be advantageously reduced (for example smaller diameter or smaller cross-sectional area of the cable harness).

One example provides for the LIN master and/or the LIN slave to be formed in a hardware-supported manner on microcontrollers used for this purpose. Functions can generally be implemented on microcontrollers by means of software or using predefined hardware blocks. Software solutions may have the advantage that they can be changed more flexibly or can perform a plurality of functions, whereas, in contrast to this, the physical hardware blocks which are implemented once can be used only for the respectively intended function. For that reason, in the case of a hardware-supported design, a required execution time, for example, can be complied with more accurately (for example a process time can be planned better) since no other processes, for example, can delay execution (as in software solutions, for example).

When transmitting LIN information (for example frame; for example header and response), a tolerance time is respectively provided according to the LIN transmission standard. In this case, an actually required transmission time (for example maximum header transmission time) may be up to 40% greater than a nominal transmission time. During the intended use of fixed time slots (for example 5 ms or 10 ms slots) during transmission via the LIN bus, a free time window therefore arises in a time slot of a frame if the reserved tolerance time is not required by active transmission mechanisms. When using hardware-supported microcontrollers to implement the LIN master and/or LIN slave, it is possible to achieve the situation in which the nominal transmission times are complied with or at least the entire reserved tolerance time is not required. The tolerance time (for example the time window) which is not required in the time slot of the LIN bus can therefore be used otherwise.

The hardware-supported microcontrollers make it possible, with a higher degree of reliability, to achieve the situation in which the provided time window (tolerance time) on the LIN bus is not required. Header information and/or response information can be advantageously transmitted from or to the LIN master via the first data connection in this time window, for example without delaying the provided cycle on the LIN bus. If the LIN function is implemented on a modern microcontroller with LIN stack hardware support, the 40% margin or the tolerance period in the timing is not required or is not completely required, for example. This time can be used, for example, for tunneling (for example header information and response information via the first data connection). The available, free time window has, for example, a length of the slot duration (that is to say nominal transmission time of header and response multiplied by a factor of 140%) minus the nominal transmission time of the header and response (for example maximum tolerance time). However, a shorter time window (for example shorter than the maximum tolerance time) may also suffice to transmit the header information and/or response information from or to the LIN master via the first data connection, for example depending on the data transmission speed of the first data connection.

As an alternative or in addition to the use of hardware-supported microcontrollers, the availability of the free time window can also be better ensured, for example, using software solutions on powerful computing units or exclusive computing units provided for the software solution.

For example, it may be possible, using the proposed system, to also transmit information via the first data connection (for example from or to the LIN master assigned to the LIN bus) within the provided time slot of the LIN bus. One example provides for the system to be designed, within a duration of a predefined nominal time slot for the data transmission of a frame (that is to say header and response transmitted via the LIN bus) via the LIN bus, to transmit both the frame via the LIN bus and header information and response information corresponding to the frame via the first data connection.

In other words, the tolerance time which is not required and is defined by the LIN transmission standard can be used to transmit (for example tunnel) the header information and/or response information via the first data connection (which can be referred to as a backbone bus, for example). This may make it possible for respective header information and/or response information to also be transmitted from or to the LIN master arranged in the central electronic control unit during the duration of the time slot on the LIN bus.

Accordingly, according to one example, the system is designed, within the mentioned tolerance time of a LIN frame that is provided according to a LIN standard, to interchange response information (for example of the same LIN frame to which the tolerance time is assigned) and header information (for example of a following LIN frame) via the first data connection between the LIN master and the local electronic control unit. It may therefore be possible to execute the LIN protocol without delay even when the header information and response information still has to be transmitted to the LIN master via the first data connection. Delay-free LIN communication can therefore advantageously take place even when the LIN bus is separated from the LIN master by the first data connection. In other words, every time slot of a LIN frame on the LIN bus can be used by the LIN master in the central electronic control unit. As a result of the fast data transmission of the first data connection, the response information may already be available in the LIN master within the tolerance time that is not required according to the LIN protocol if the LIN frame has not yet expired in terms of time. In response to the received response information, the LIN master can then send further header information to the decentralized LIN slave, with the result that this information may also already be available at the local electronic control unit if the LIN frame has not yet expired in terms of time (see also the example in FIG. 5 of the disclosure). This makes it possible to advantageously combine delay-free LIN communication and the flexibility of the decentralized system.

One example provides for the central electronic control unit to comprise a plurality of LIN masters and for the local electronic control unit to be coupled to a plurality of LIN buses. As already mentioned above, the faster first data connection and/or the use of the free time window in the time slot make(s) it possible, for example, to achieve the situation in which the data transmission of header information and/or response information between the LIN masters of the central electronic control unit and the respective LIN buses can be carried out using the shared first data connection, thus making it possible to reduce a cable requirement of the system, for example.

One example provides for the system to also comprise at least one second local electronic control unit which, like the (for example first) local electronic control unit described above, is also coupled to the central electronic control unit by means of the first data connection. For example, a more decentralized distribution of the local electronic control units may enable better cable routing (for example, a shorter required total length of LIN bus cables can be achieved).

One example provides for the data transmission speed of the first data connection to be at least 10 times (or 20 times or 50 times) the data transmission speed of the LIN bus. Such a faster transmission speed via the first data connection may make it possible, for example, to operate a higher number of LIN buses by means of LIN masters which are arranged in the central electronic control unit. For example, it may also be possible to transmit further information (for example additional information or information that differs from header information and response information) via the first data connection, for example without resulting in collisions or delays during transmission via the first data connection.

One example provides for the first data connection to be designed according to an Ethernet standard, a CAN standard, a FlexRay standard, a radio-based transmission standard (for example WLAN or Bluetooth) or a home network standard (for example HomeGrid-G.hn). The use of these standards may enable a required data transmission speed of the first data connection.

A further aspect relates to a method for controlling a LIN slave connected to a LIN bus. The method may be carried out, for example, using a system described above or below. The method comprises transmitting header information from a LIN master of a central electronic control unit to a local electronic control unit via a first data connection between the central electronic control unit and the local electronic control unit. In this case, the first data connection has a higher data transmission speed than the LIN bus. The method also comprises receiving the header information at the local electronic control unit, and transmitting the header information to the LIN slave via the LIN bus connected to the local electronic control unit.

For example, provision is made for the method to also comprise receiving response information corresponding to the header information from the LIN slave at the local electronic control unit, and transmitting the response information from the local electronic control unit to the LIN master of the central electronic control unit via the first data connection.

According to the method, a LIN slave, which is connected to a local electronic control unit via a LIN bus, can therefore be advantageously controlled, for example, by means of a LIN master arranged in a central electronic control unit. Using the faster first data connection means that header information and/or response information can be transmitted more quickly, for example, with the result that the first data connection can be jointly used to control a plurality of LIN buses. A cable requirement needed to electronic control units on LIN buses can therefore be reduced overall, for example.

For example, a predetermined time slot (for example a 5 ms or 10 ms slot provided according to the LIN transmission) can be used to transmit the header information and the response information via the LIN bus (for example LIN frame). Provision is also made for the response information and/or further header information to be transmitted via the first data connection within a time window reserved in the time slot. The availability of the time window can be enabled by virtue of a tolerance time reserved in the time slot according to the LIN standard not being needed for the transmission on the LIN bus. This can be achieved, for example, as already described, by using hardware-based microcontrollers when implementing the LIN master and/or LIN slave.

For example, provision may be made for the header to be transmitted on the LIN bus at the beginning of the time slot. The free time window can therefore be provided at the end of the time slot. Before temporally reaching the time window within the time slot, the response can be received at the local electronic control unit via the LIN bus, with the result that corresponding response information can be transmitted in the free time window to the LIN master via the first data connection. So that an accordingly next header can be transmitted in a subsequent time slot via the LIN bus, the header information for the subsequent time slot is also transmitted to the local electronic control unit via the first data connection, for example within the time window (also see in this respect the example in combination with FIG. 5). Overall, the header information and the response information of a frame (for example LIN bus frame) can therefore be transmitted from the LIN master via the first data connection within a provided duration of the time slot (for example shifted with respect to the actual time slot on the LIN bus) and can be received at the LIN master again. As a result, a time delay when controlling the LIN slaves can also be avoided when using the first data connection.

One example provides for the reserved time window to have a duration of at least 0.2 ms (or of at least 0.5 ms, of at least 1 ms, of at least 1.5 ms or of at least 2 ms) and/or of at most 5 ms (or of at most 4 ms or of at most 3.5 ms). Within this time, the header information and/or the response information, for example, can be transmitted via the first data connection between the central electronic control unit and the local electronic control unit.

One example provides for the method to also comprise transmitting second header information from a second LIN master of the central electronic control unit via the first data connection. In this case, the second header information is transmitted in a delayed manner with a time offset which is selected on the basis of a data transmission speed of the first data connection.

The first header information is transmitted to a LIN slave on a first LIN bus, and the second, delayed header information is transmitted to a LIN slave on a second LIN bus (for example coupled to the same local electronic control unit or to another local electronic control unit). As a result of the fact that the data transmission speed of the first data connection is higher than that of the LIN buses, both items of header information can be transmitted on the shared data line. Using the time offset makes it possible to avoid a collision of header information on the first data connection.

For example, a time offset of a duration of at least 20 µs (or at least 50 µs or at least 100 µs) can be selected between the transmission of two items of header information via the first data connection. For example, a time offset can also be selected in such a manner that the respective response information can be transmitted back to the respective LIN masters via the first data connection without colliding with subsequent header information on the first data connection. This makes it possible to avoid latencies on account of collisions, for example.

One example provides, during transmission via the first data connection, for the header information to be embedded in a data packet of a standard of the first data connection. The first data connection may be a CAN bus, for example, and the header information can be embedded in a CAN frame. Accordingly, the response information can also be embedded in a respective data packet of the standard used. With a variable length of data packets, a frame size which is as small as possible and in which the header information and/or response information can be transmitted can be advantageously selected for transmission via the first data connection (for example smallest available frame size of the standard of the first data connection).

For example, an Ethernet connection may be used as the first data connection, and, during transmission via the Ethernet connection, the header information and/or the response information may be embedded in a 64-byte Ethernet frame. The advantage may be that the header information and response information (for example if the master itself transmits data) can each be completely transmitted in a 64-byte Ethernet frame and a transmission time via the first data connection may be very short. For example, it is possible to use an Ethernet connection with a maximum of 10 Mbit/s since this can enable sufficiently fast data transmission and/or a more economical design of the first data connection.

A further aspect relates to a motor vehicle having a system described above or below. In this case, provision is made, in particular, for a transmission cable of the first data connection and/or of the LIN bus to be routed through a vehicle pillar of the motor vehicle. For example, the transmission cable of the first data connection (for example CAN bus or Ethernet cable) may be routed through the vehicle pillar, with the result that it is possible to dispense with a multiplicity of LIN bus cables in the vehicle pillar. For example, the system may make it possible for not all LIN bus cables of the system to have to be routed through the vehicle pillar, but rather for the number of LIN bus cables in the vehicle pillar to be able to be limited. This may advantageously result in the cable harness being passed through the vehicle pillar more easily, for example.

Alternatively, the proposed system can also be used, for example, in other vehicles (for example aircraft or watercraft) and generally in local area networks (for example in smart home units or home networks, as defined, for instance, by the HomeGrid standard).

One aspect relates to a system for transmitting data. The system comprises a central electronic control unit in which at least one master of a bus (for example a serial bus) is formed. At least one local electronic control unit is also provided and is coupled to the central electronic control unit by means of a first data connection. The local electronic control unit is also coupled to a bus which is assigned to the master of the bus and to which at least one slave of the bus is connected. In this case, provision is made for a data transmission speed of the first data connection between the central electronic control unit and the local electronic control unit to be higher than a data transmission speed of the bus. The bus may be, for example, a LIN bus, a CAN bus or a FlexRay bus. The first data connection may be an Ethernet connection, for example.

Further details and aspects are mentioned in conjunction with the examples described above or below. The examples described may have one or more optional additional features which correspond to one or more aspects which are mentioned in conjunction with the proposed concept or with one or more examples described above or below (for example FIGS. 1-6).

BRIEF DESCRIPTION OF THE DRAWINGS

Examples are explained in more detail below with reference to the accompanying figures, in which.

DETAILED DESCRIPTION

Various examples are now described in more detail with reference to the accompanying drawings which illustrate some examples. In the figures, the thickness dimensions of lines, layers and/or regions may be illustrated in an exaggerated form for the sake of clarity. In the following description of the attached figures which show only some examples, identical reference signs may denote identical or comparable components.

An element which is referred to as being "connected" or "coupled" to another element may be directly connected or coupled to the other element or there may be elements in between. As long as there is no definition to the contrary, all terms used herein (including technical and scientific terms) have the same meaning as that attributed to them by a person of average skill in the art in the field to which the examples belong.

Figure 1:
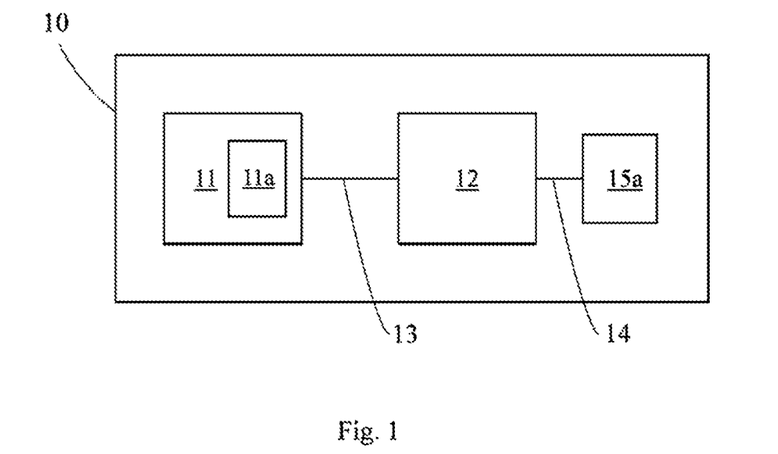
FIG. 1 shows a schematic example of a system having a central electronic control unit and a local electronic control unit.

FIG. 1 shows a schematic example of a system 10 having a central electronic control unit 11 and a local electronic control unit 12. The central electronic control unit 11 and the local electronic control unit 12 are connected by means of a first data connection 13. At least one bus, in particular a LIN bus 14 having at least one slave, in particular a LIN slave 15a, is also coupled to the local electronic control unit 12. The LIN bus 14 and the LIN slave 15a are assigned to a master, in particular a LIN master 11a, which is arranged in the central electronic control unit 11. The system 10 may be used in motor vehicles, for example.

Providing the first data connection 13 having a higher data transmission speed than the LIN bus may make it possible, for example, to connect further LIN buses to the local electronic control unit 12 without their transmission cables each having to be individually routed to the central electronic control unit 11 with the associated LIN masters. As a result, the system 10 may make it possible to reduce a cable requirement when using a plurality of LIN buses.

For example, the first data connection 13 may be used as a central data connection (for example central bus or backbone bus) in order to tunnel header information and response information from the respective LIN bus to the associated LIN masters in the central electronic control unit 11.

Alternatively, instead of the LIN bus, it is also possible to provide another bus system which has a lower data transmission speed than the first data connection 13.

Further details and aspects are mentioned in conjunction with the examples described above or below. The example shown in FIG. 1 may have one or more optional additional features which correspond to one or more aspects mentioned in conjunction with the proposed concept or with one or more examples described above or below (for example FIGS. 2-6).

Figure 2:
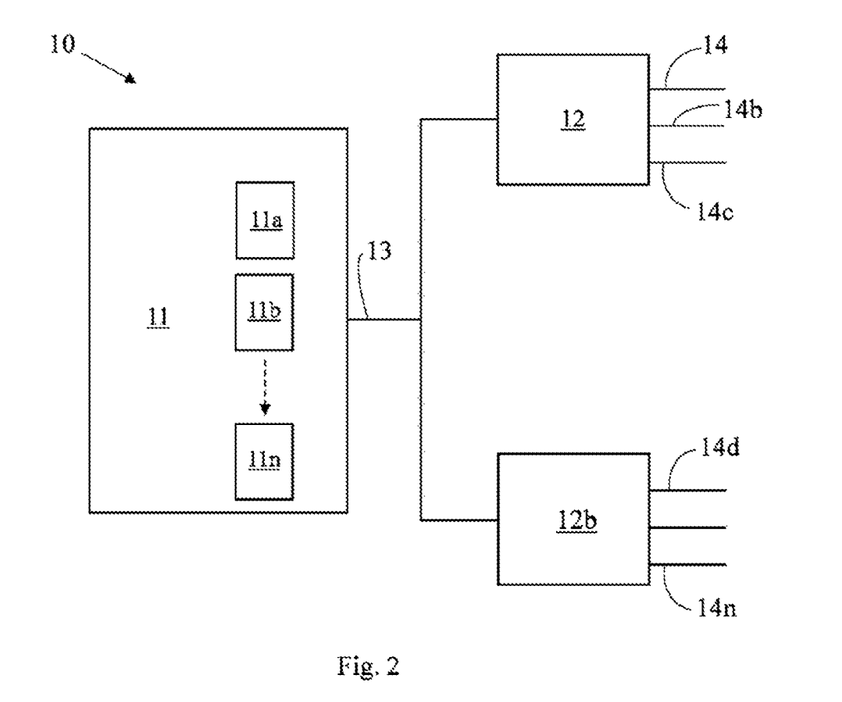
FIG. 2 shows a schematic example of a system having two local electronic control units.

FIG. 2 shows a schematic example of a system 10 having two local electronic control units 12, 12b. In this case, a plurality of LIN masters 11a, 11b, 11n are arranged in the central electronic control unit 11. Three LIN masters (inter alia LIN masters 11a, 11b) can be used to control LIN buses 14, 14b, 14c connected to the first local electronic control unit 12. Further LIN masters (inter alia LIN master 11n) can be used to control LIN buses 14d, 14n connected to the second local electronic control unit 12b.

For example, the two local electronic control units 12, 12b may be arranged at different positions which are each closer to LIN slaves assigned to the LIN buses. This makes it possible to further reduce overall a required cable length for the LIN buses 14, 14b, 14c, 14d, 14n since the two local electronic control units 12, 12b can share the first data connection 13. For example, further local electronic control units can be coupled to the first data connection 13 in a similar manner.

Further details and aspects are mentioned in conjunction with the examples described above or below. The example shown in FIG. 2 may have one or more optional additional features which correspond to one or more aspects mentioned in conjunction with the proposed concept or with one or more examples described above (for example FIG. 1) or below (for example FIGS. 3-6).

Figure 3:
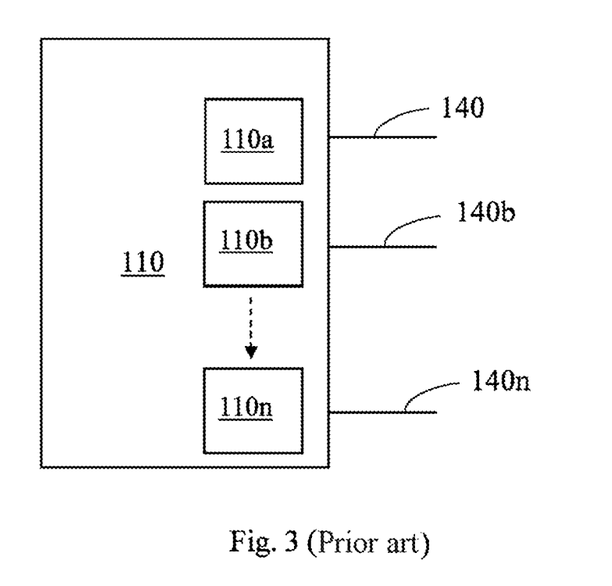
FIG. 3 shows an example of a system having LIN buses.

FIG. 3 shows an example of a conventional system having a plurality of LIN buses 140, 140b, 140n. The LIN buses 140, 140b, 140n are all directly connected to the electronic control unit 110 in which respective LIN masters 110a, 110b, 110n assigned to the buses are arranged. In contrast to the proposed system 10, this increases the need for transmission cables with each additional LIN bus since no shared transmission cable can be used for a plurality of LIN buses.

Figure 4:
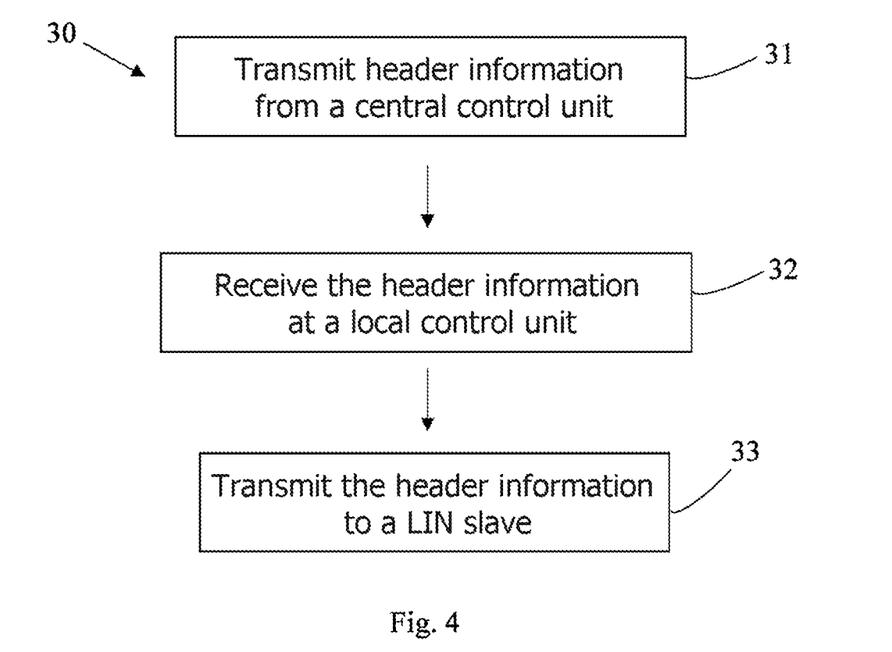
FIG. 4 shows a flowchart of a method for controlling a LIN slave.

FIG. 4 shows a flowchart of a method 30 for controlling a LIN slave. The method 30 comprises transmitting 31 header information from a LIN master of a central electronic control unit to a local electronic control unit via a first data connection between the central electronic control unit and the local electronic control unit. In this case, use is made of the first data connection having a higher data transmission speed than the LIN bus. The method 30 also comprises receiving 32 the header information at the local electronic control unit, and transmitting 33 the header information to the LIN slave via the LIN bus connected to the local electronic control unit.

The method 30 may make it possible to transmit header information for a plurality of LIN buses via a shared data channel, the first data connection. This makes it possible to reduce a necessary cable requirement, for example.

Further details and aspects are mentioned in conjunction with the examples described above or below. The example shown in FIG. 4 may have one or more optional additional features which correspond to one or more aspects mentioned in conjunction with the proposed concept or with one or more examples described above (for example FIGS. 1-3) or below (for example FIGS. 5-6).

Figure 5:
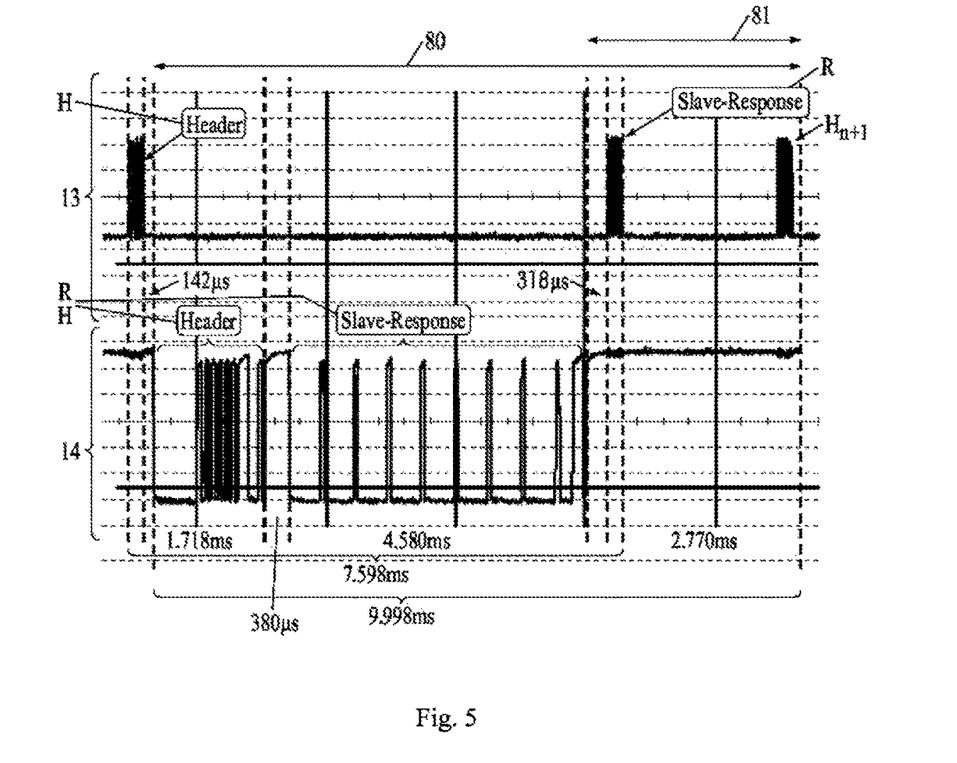
FIG. 5 shows an example of transmission of header information and response information via a first data connection and a LIN bus.

FIG. 5 shows an example of transmission of header information H and response information R via a first data connection 13 (for example a CAN bus; see upper half of FIG. 5) and a LIN bus 14. A time slot 80 is used to transmit a frame comprising a header (header information H) and a response or slave response (response information R) via the LIN bus 14 (see lower half of FIG. 5). The illustrated length of the time slot 80 is purely exemplary and, instead of the 10 ms illustrated, may also be 5 ms or have other durations.

As can be seen, a first part of the time slot 80 suffices to transmit the header information H and response information R via the LIN bus 14, with the result that a free time window 81 arises or can be used until the beginning of a next time slot. For example, the duration of the time window is approximately 33% of the duration of the time slot 80 (for example at most 40% and/or at least 20% of the duration of the time slot 80). The free time window 81 can be provided if the tolerance times defined in the LIN transmission standard are not needed to transmit the LIN frame. The free time window 81 can therefore also be referred to as a tolerance time 81.

The free time window 81 in which no information is transmitted via the LIN bus 14 can be used to transmit the response information R back to the LIN master in the central electronic control unit via the first data connection 13 (for example tunneling the response information R). Furthermore, further header information $H_{n+1}$ for transmitting a header via the LIN bus 14 in the next time slot can be transmitted from the LIN master to the local electronic control unit via the first data connection 13. The header information R for the illustrated LIN frame of the time slot 80 was accordingly transmitted in a free time window of the previous time slot (see header information H on the first data connection 13 temporally before the beginning of the time slot 80). The period of time from the beginning of the transmission of the header information H via the first data connection 13 to the end of the reception of the associated response information R via the first data connection 13 may therefore be effected in a period of time which is shorter than the duration of the time slot 80.

Further details and aspects are mentioned in conjunction with the examples described above or below. The example shown in FIG. 5 may have one or more optional additional features which correspond to one or more aspects mentioned in conjunction with the proposed concept or with one or more examples described above (for example FIGS. 1-4) or below (for example FIG. 6).

Figure 6:
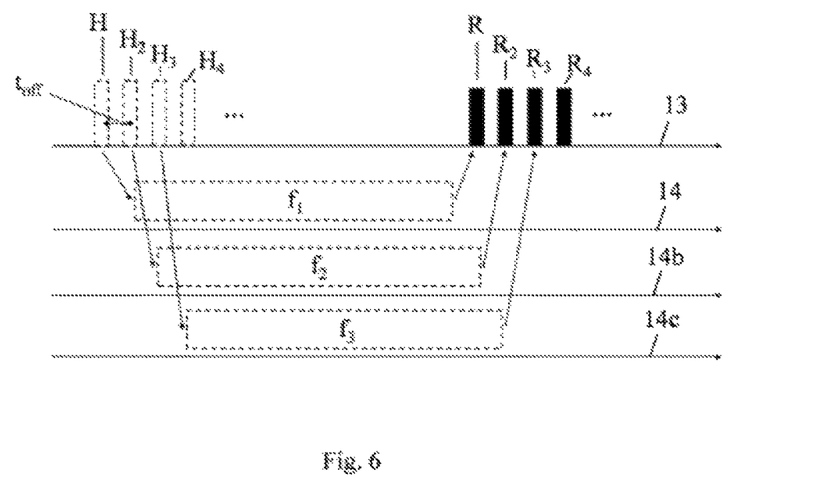
FIG. 6 shows an example of transmission of a plurality of frames via the first data connection to a plurality of LIN buses using a time offset.

FIG. 6 shows an example of transmission of a plurality of frames $f_1$, $f_2$, $f_3$ via the first data connection 13 to a plurality of LIN buses 14, 14b, 14c using a time offset $t_{off}$. The time offset $t_{off}$ may describe, for example, the period of time between the beginning of the first header information H and the beginning of the next header information $H_2$. For example, the transmission of header information via the first data connection 13 may last for between 50 and 60 µs and the time offset $t_{off}$ may be 100 µs. For example, the time offset $t_{off}$ may define a period of time between the end of the transmission of the header information H and the beginning of the transmission of the header information $H_2$ and may be, for example, more than 10 µs and/or less than 50 µs.

The header information H, $H_2$, $H_3$ is successively transmitted by different LIN masters, via the first data connection 13, to the various LIN buses 14, 14b, 14c each assigned to the LIN masters. As can be seen, the slower data transmission of the frames $f_1$, $f_2$, $f_3$ via the LIN buses 14, 14b, 14c requires more time than the data transmission of header information and response information via the first data connection 13. Therefore, after the first header information H has been transmitted by a first LIN master via the first data connection 13, further header information $H_2$, $H_3$, etc. can be transmitted by further LIN masters, for example as long as the frame $f_1$ is transmitted via the LIN bus 14. For example, a maximum possible number of items of header information H, $H_2$, $H_3$, etc. which can be transmitted via the shared data connection 13 may depend on the data transmission speed and/or the length of the time offset $t_{off}$ and/or the duration of the frame $f_1$. For example, the time offset $t_{off}$ can be selected in such a manner that response information can be transmitted via the first data connection 13 between the transmission of two successive items of header information in order to achieve, for example, permanently alternating transmission of header information and response information via the first data connection 13.

Synchronization of the LIN masters with the offset $t_{off}$ may enable, for example, collision-free scheduling on the backbone bus (for example first data connection 13). For example, the time slots of the LIN buses 14, 14b, 14c are each arranged in a manner offset by the time offset. The use of the synchronization or time offset may make it possible for the plurality of LIN masters to subsequently be able to transmit further headers of subsequent LIN frames for the assigned LIN buses 14, 14b, 14c via the first data connection 13 without producing collisions on the first data connection 13.

Further details and aspects are mentioned in conjunction with the examples described above or below. The example shown in FIG. 6 may have one or more optional additional features which correspond to one or more aspects mentioned in conjunction with the proposed concept or with one or more examples described above (for example FIGS. 1-5) or below.

Examples relate to a method for tunneling a LIN bus 14 via a backbone bus (for example the first data connection 13, for example a CAN bus or an Ethernet connection). In order to be able to automatically produce the cable harness in a more streamlined and cheaper and/or better manner, one or more backbone buses (for example, first data connection) are introduced, via which buses, for example LIN, CAN, FlexRay, and discrete signals can be tunneled.

In this case, tolerances present in the LIN specification can be used, in particular. These tolerances (for example free time window 81) are no longer needed on the LIN bus, for example, in the case of modern available microcontrollers (μCs) with hardware LIN logic (for example, hardware-supported). It is possible to carry out synchronization with time offset of the LIN masters of those LIN buses which are intended to be tunneled together. For example, a time buffer (for example the time window 81) is provided for tunneling LIN buses. If a plurality of LIN buses are tunneled on the same backbone bus, collisions can be avoided by means of proposed concepts. For example, a plurality of LIN buses can be routed from a central electronic control unit to a rear electronic control unit and/or roof electronic control unit.

The invention claimed is:

1. A system for transmitting data in a motor vehicle, comprising:
   a central electronic control unit comprising a local interconnect network ("LIN") master; and
   a local electronic control unit coupled to the central electronic control unit by a first data connection, wherein
   the local electronic control unit is also coupled to a LIN bus assigned to the LIN master and to a LIN slave, and
   a data transmission speed of the first data connection between the central electronic control unit and the local electronic control unit is higher than a data transmission speed of the LIN bus.

2. The system according to claim 1, wherein
   the LIN master and/or the LIN slave is/are formed in a hardware-supported manner on microcontrollers.

3. The system according to claim 1, wherein
   the system is configured, within a duration of a predefined nominal time slot for the data transmission of a frame via the LIN bus, to transmit both the frame via the LIN bus and header information and response information corresponding to the frame via the first data connection.

4. The system according to claim 1, wherein
   the system is configured, within a tolerance time of a LIN frame that is provided according to a LIN standard, to interchange response information and header information via the first data connection between the LIN master and the local electronic control unit.

5. The system according to claim 1, further comprising:
   a second local electronic control unit which is coupled to the central electronic control unit via the first data connection.

6. The system according to claim 1, wherein
   the central electronic control unit comprises:
      a plurality of LIN masters, and
      the local electronic control unit is coupled to a plurality of LIN buses.

7. The system according to claim 1, wherein
   the data transmission speed of the first data connection is higher than the data transmission speed of the LIN bus at least by a factor of 10.

8. The system according to claim 1, wherein
   the first data connection is designed according to an Ethernet standard, a CAN standard, a FlexRay standard, a radio-based transmission standard, or a home network standard.

9. A motor vehicle having a system according to claim 1, wherein
   a transmission cable of the first data connection and/or of the LIN bus is routed through a vehicle pillar of the motor vehicle.

10. A method for controlling a local interconnect network ("LIN") slave connected to a LIN bus, comprising:
    transmitting header information from a LIN master of a central electronic control unit to a local electronic control unit via a first data connection between the central electronic control unit and the local electronic control unit, wherein the first data connection has a higher data transmission speed than the LIN bus;
    receiving the header information at the local electronic control unit; and
    transmitting the header information to the LIN slave via the LIN bus connected to the local electronic control unit.

11. The method according to claim 10, also comprising:
    receiving response information corresponding to the header information from the LIN slave at the local electronic control unit; and
    transmitting the response information from the local electronic control unit to the LIN master of the central electronic control unit via the first data connection,
    wherein a predetermined time slot is used to transmit the header information and the response information via the LIN bus,
    wherein the response information and/or further header information is transmitted via the first data connection within a time window reserved in the time slot.

12. The method according to claim 11, wherein
    the reserved time window has a duration of at least 0.5 ms.

13. The method according to claim 10, further comprising:
    transmitting second header information from a second LIN master of the central electronic control unit via the first data connection, wherein
    the second header information is transmitted in a delayed manner with a time offset ($t_{off}$) which is selected based on a data transmission speed of the first data connection.

14. The method according to claim 10, wherein
    during transmission via the first data connection, the header information is embedded in a data packet of a standard of the first data connection.

15. The method according to claim 10, wherein
    an Ethernet connection is used as the first data connection, and, during transmission via the Ethernet connection, the header information and/or the response information is embedded in a 64-byte Ethernet frame.

* * * * *